(12) United States Patent
Hymel

(10) Patent No.: US 6,246,336 B1
(45) Date of Patent: *Jun. 12, 2001

(54) RADIO COMMUNICATION SYSTEM FOR COMMUNICATING SCHEDULED MESSAGES AND METHOD THEREFOR

(75) Inventor: James Allen Hymel, Lake Worth, FL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,245

(22) Filed: Jun. 24, 1998

(51) Int. Cl.$^7$ ........................................ G08B 3/10
(52) U.S. Cl. ............................ 340/825.44; 340/825.22
(58) Field of Search .................. 340/825.44, 825.47, 340/825.22

(56) References Cited

U.S. PATENT DOCUMENTS

| | | | |
|---|---|---|---|
| 5,530,918 | * 6/1996 | Jasinski | 340/825.44 |
| 5,596,315 | * 1/1997 | Olds | 340/825.44 |
| 5,726,639 | 3/1998 | Romero et al. . | |
| 5,748,100 | * 5/1998 | Gutman | 340/825.44 |
| 5,870,030 | * 2/1999 | DeLuca | 340/825.44 |

* cited by examiner

Primary Examiner—Brian Zimmerman
(74) Attorney, Agent, or Firm—Randi L. Dulaney

(57) ABSTRACT

A communication system includes a radio communication system (102) for communicating scheduled messages to SCRs (Selective Call Radios) (122). The radio communication system is programmed to transmit to a SCR a first radio signal including an advertisement schedule detailing multiple times of arrival for a plurality of advertisement messages (402). Subsequently, a second radio signal including an advertisement message is transmitted to the SCR at a first arrival time (404). The SCR is programmed to receive the first radio signal, and store the advertisement schedule (406, 408). At or near the first arrival time, the SCR determines a likelihood that it can decode the advertisement message properly (410, 412). When the likelihood of decoding the advertisement message properly is below a predetermined expectation, the SCR disregards the second radio signal, and schedules itself to receive the advertisement message at a second arrival time defined by the advertisement schedule (416, 418).

20 Claims, 3 Drawing Sheets

RADIO COMMUNICATION SYSTEM FOR COMMUNICATING SCHEDULED MESSAGES AND METHOD THEREFOR

RELATED INVENTION

The present invention is related to the following invention which is assigned to the same assignee as the present invention:

application Ser. No. 08/627,642 filed Mar. 30, 1996 by Deluca et al., entitled "Advertiser Pays Information and Messaging System and Apparatus" now U.S. Pat. No. 5,870,030.

FIELD OF THE INVENTION

This invention relates in general to radio communication systems, and particularly, to a radio communication system for communicating scheduled messages and method therefor.

BACKGROUND OF THE INVENTION

Radio communication systems that transmit selective call messages to SCRs (selective call radios), such as cellular phones and pagers, have been in use for some time now. The type of selective call messages transmitted to SCRs range anywhere from personal messaging (e.g., pages, telephony) to information services (e.g., advertising, news, weather, etc.).

Although ideally it would be desirable to transmit and receive selective call messages in an error-free manner, environmental disturbances can cause irreparable errors in messages received by a SCR. At times such errors may be undetectable, and may result in the decoding of a corrupt selective call message. For information services, the ability to receive and decode messages at a SCR in a manner that allows reconstruction of the original message without error is important to a service provider of the radio communication system, and especially important to sponsors of paid advertisement messages.

Sponsors of advertisements expect that a service provider will provide a communication medium capable of communicating advertisement messages to targeted SCRs in an error-free manner. The importance of message integrity is apparent in cases where an advertisement includes an offer for the sale of goods at specified prices and specified times. An irreparable and/or undetectable error in an advertisement message received by a SCR could inadvertently result in misquoted information in the advertisement, e.g., a misquoted price. Such an error would cause substantial dissatisfaction amongst SCR users who may have relied on the advertisement information they received.

Accordingly, a need exists for a communication medium that substantially eliminates the foregoing disadvantages described in the prior art.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
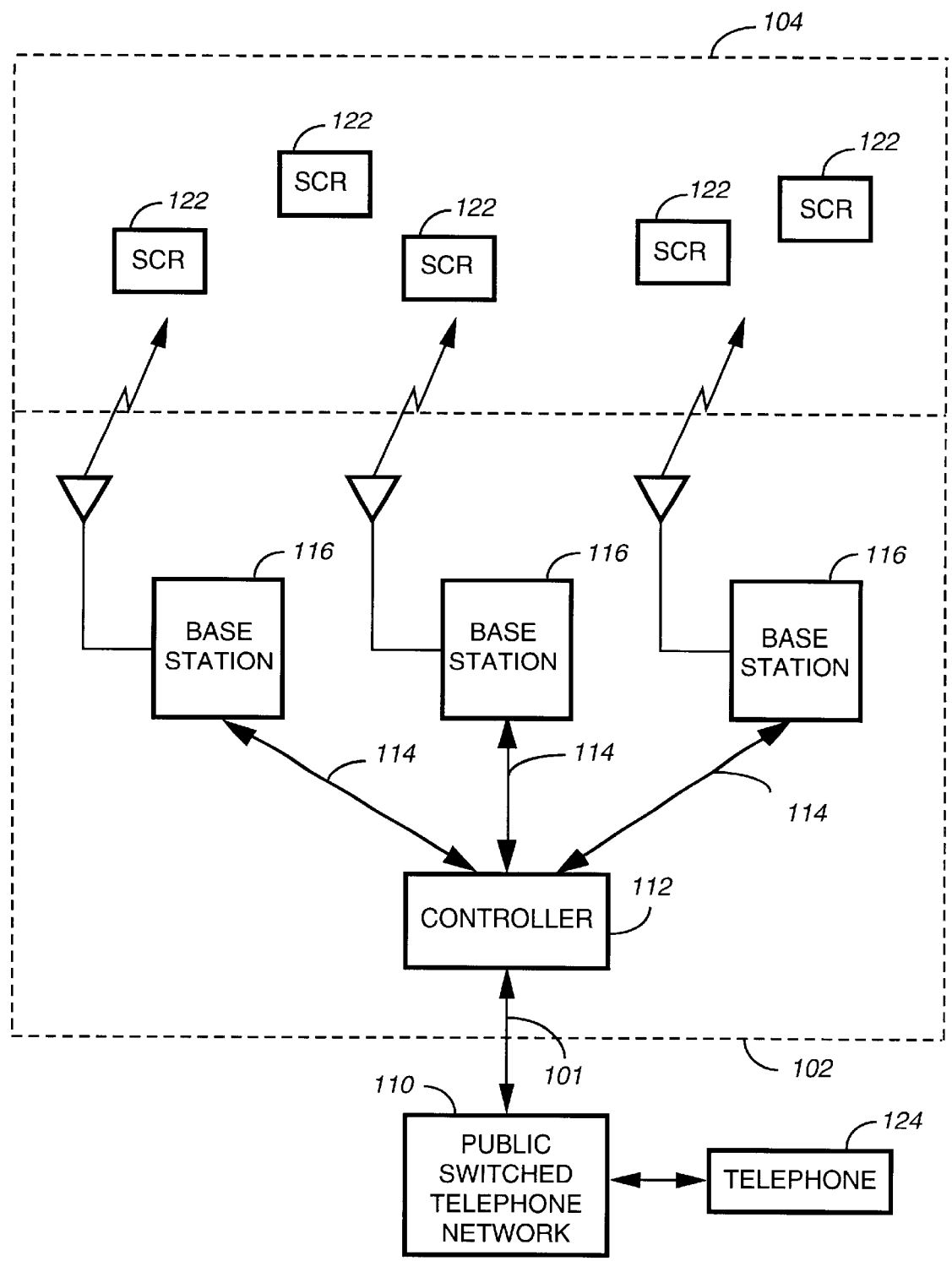
FIG. 1 is an electrical block diagram of a communication system utilized by the present invention.

FIG. 1 is an electrical block diagram of a communication system 100 according to the present invention. The communication system 100 comprises a radio communication system 102 and a portable portion 104 comprising a plurality of SCRs 122 (selective call radios). The radio communication system 102 includes a controller 112 for controlling operation of a plurality of base stations 116 by way of conventional communication links 114, such as, e.g., microwave links. The plurality of SCRs 122 in the portable portion 104 are used for receiving selective call messages from the base stations 116 under the control of the controller 112.

The controller 112 receives messages from callers utilizing a conventional telephone 124 for communicating with a conventional PSTN (public switch telephone network) 110. The PSTN 110 relays messages to the controller 112 through a conventional telephone line 101 coupled to the controller 112. Upon receiving messages from the PSTN 110, the controller 112 processes the messages, and delivers them to the base stations 116 for transmission to designated SCRs 122. In addition to transmitting selective call messages, the controller 112 is programmed to either selectively transmit or broadcast advertisements to the plurality of SCRs 122.

Figure 2:
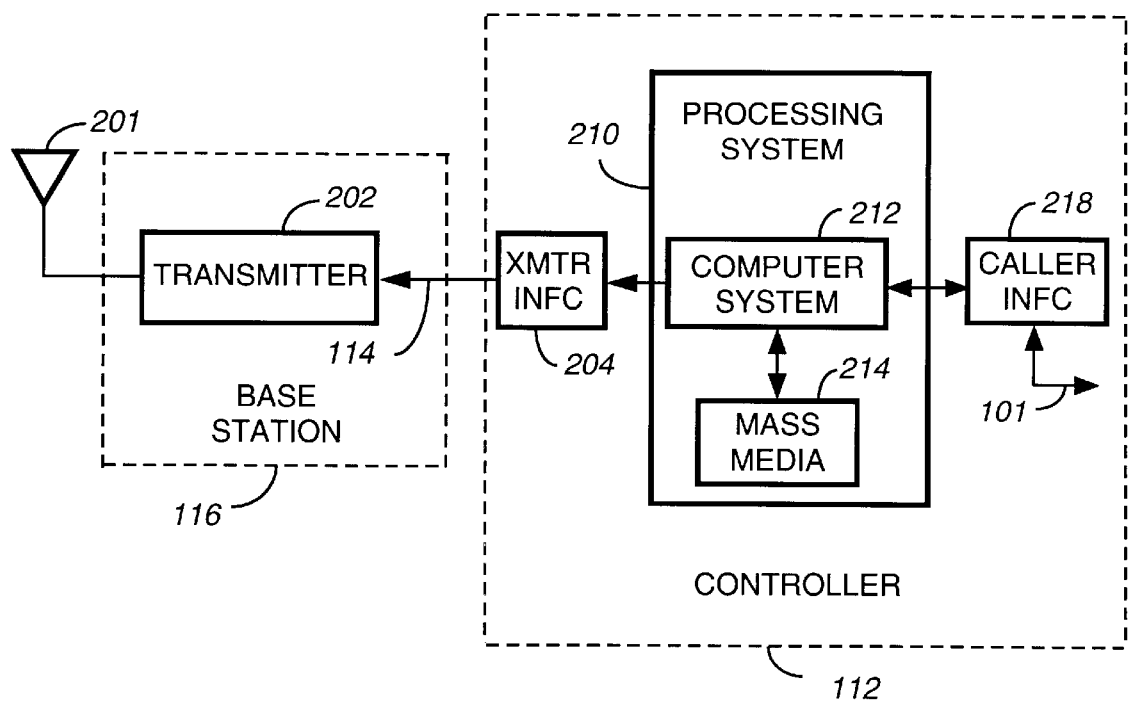
FIGS. 2 and 3 are electrical block diagrams of the radio communication system and the SCR (selective call radio) of FIG. 1, respectively.
Figure 3:
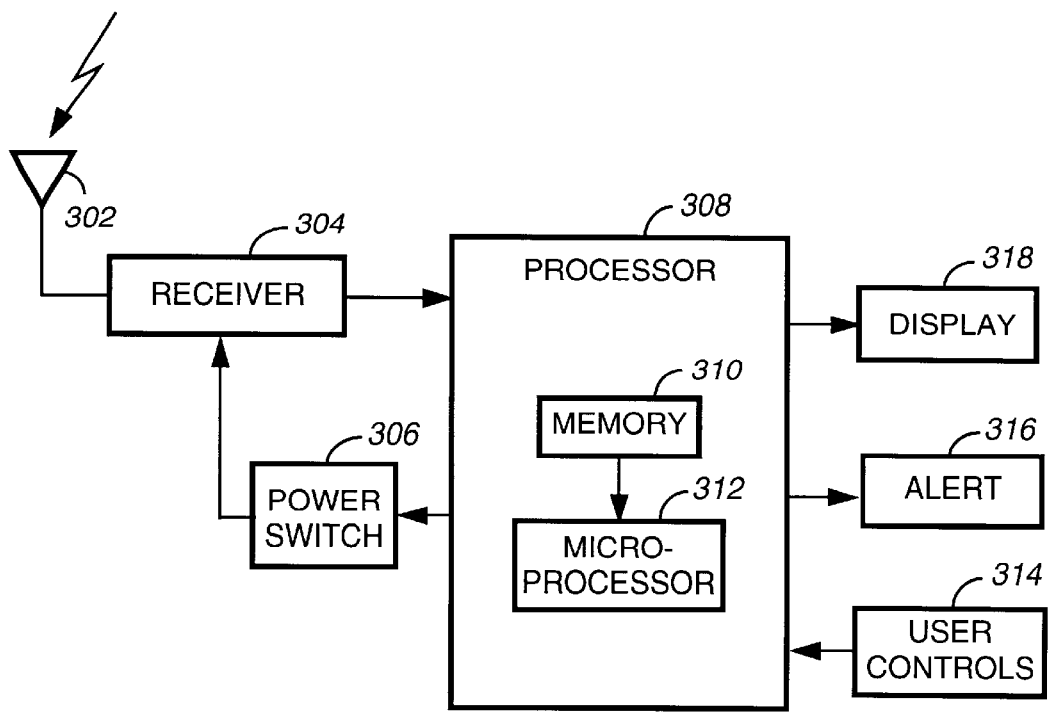

FIGS. 2 and 3 are electrical block diagrams of the radio communication system 102 and the SCR 122 of FIG. 1, respectively. The electrical block diagram of the radio communication system 102 includes the elements of the controller 112 and the base stations 116. The controller 112 comprises a conventional processing system 210 for controlling operation of the base stations 116, a conventional caller interface 218 for receiving messages from the PSTN 110, and a conventional transmitter interface 204 for communicating messages to the base stations 116. The processing system 210 includes conventional hardware such as a computer system 212 and mass media 214 to perform the programmed operations of the controller 112. The base stations 116 comprise a conventional RF transmitter 202 coupled to an antenna 201 for transmitting the messages received from the controller 112.

The SCR 122 comprises an antenna 302 for intercepting RF signals from the radio communication system 102. The antenna 302 is coupled to a receiver 304 employing conventional demodulation techniques for receiving the communication signals transmitted by the radio communication system. Radio signals received by the receiver 304 produce demodulated information, which is coupled to a processor 308 for processing received messages. A conventional power switch 306, coupled to the processor 308, is used to control the supply of power to the receiver 304, thereby providing a battery saving function.

To perform the necessary functions of the SCR 122, the processor 308 includes a microprocessor 312, and a memory 310 including, for example, a random access memory (RAM), a read-only memory (ROM), and an electrically erasable programmable read-only memory (EEPROM). The processor 308 is programmed by way of the ROM to process incoming messages transmitted by the radio communication system 102. The processor 308 decodes an address in the demodulated data of the received message, compares the decoded address with one or more addresses stored in the EEPROM, and when a match is detected, proceeds to process the remaining portion of the message.

Once the processor 308 has processed the message, it stores the message in the RAM, and a call alerting signal is generated to alert a user that a message has been received. The call alerting signal is directed to a conventional audible or tactile alerting device 316 for generating an audible or tactile call alerting signal. The message can be accessed by the user through user controls 314, which provide functions such as lock, unlock, delete, read, etc. More specifically, by the use of appropriate functions provided by the user controls 314, the message is recovered from the RAM, and conveyed to the user by way of a display 318 (e.g., a conventional liquid crystal display—LCD). It will be appreciated that, alternatively, the display 318 can be accompanied with an audio circuit (not shown) for conveying, for example, audio-visual voice messages.

Preferably, the communication system 100 employs the Flex protocol, developed by Motorola, Inc. (Flex is a trademark of Motorola, Inc.), for transmitting messages to the SCRs 122. The Flex protocol is a digital selective call signaling protocol that is presently used by various system operators in the United States and in several other countries. It will be appreciated that, alternatively, other digital signaling protocols may be used consistent with the present invention.

Figure 4:
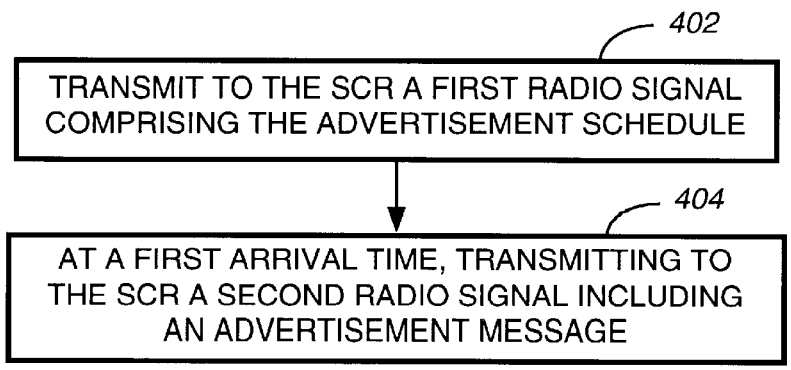
FIGS. 4 and 5 depict flowcharts summarizing the operation of the communication system of FIG. 1 according to the present invention.
Figure 5:
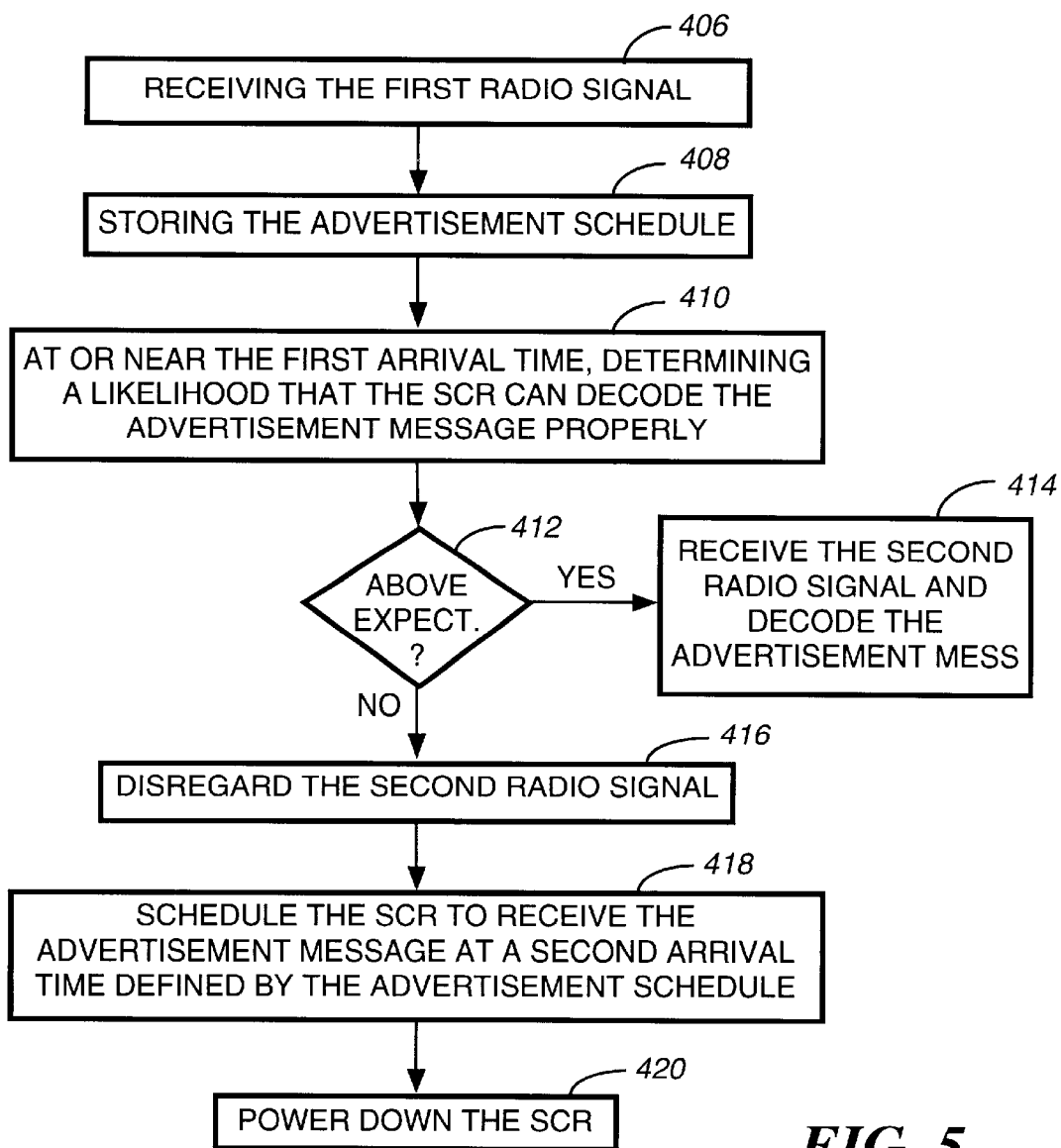

FIGS. 4 and 5 show flowcharts summarizing the operation of the communication system 100 of FIG. 1 according to the present invention. These flowcharts show the programmed steps of the radio communication system 102 and the SCRs 122, which together comprise the communication system 100.

As noted earlier, in addition to transmitting selective call messages to the SCRs 122, the radio communication system 102 is also programmed to transmit advertisement messages to the SCRs 122. As a first step in transmitting advertisement messages, the processing system 210 of the controller 112, in step 402, is programmed to cause one or more transmitters 202 to transmit to at least one SCR 122 a first radio signal comprising an advertisement schedule detailing multiple times of arrival for a plurality of advertisement messages. The purpose of the advertisement schedule is to inform an SCR 122 of the arrival times for each advertisement message that will be transmitted multiple times during, e.g., a twenty-four hour period. As an example, advertisement message no. 1 might have a transmission schedule as follows: 8:05 a.m., 11:05 a.m., 12:35 p.m., 3:25 p.m., and so.

Subsequently, in step 404, the processing system 210 causes the transmitters 202 to transmit to the SCRs 122 a second radio signal comprising an advertisement message at a first arrival time according to the advertisement schedule. The first arrival time is a selected one of the scheduled times defined by the advertisement schedule, e.g., 8:05 a.m. Although not shown, step 404 is repeated for other advertisement messages as they are scheduled for transmission throughout the day according to the advertisement schedule. It will also be appreciated that an advertisement schedule may be transmitted more than once a day to account for SCRs 122 that might begin service for the first time at differing times during the day. Knowing that advertisement messages will be transmitted multiple times a day, an SCR 122 can be programmed to assure that an advertisement message will be received and decoded properly during one of the scheduled arrival times. The manner in which an SCR 122 accomplishes this is depicted by the flowchart of FIG. 5.

In step 406, the processor 308 of the SCR 122 is programmed to cause the receiver 304 to receive the first radio signal originally transmitted by the radio communication 102. The processor 308 then proceeds to step 408 where it decodes and stores in the memory 310 the advertisement schedule included in the first radio signal. At or near the first arrival time (e.g., 8:05 a.m.) when the advertisement message (transmitted in step 404) is to be received as a second radio signal according to the advertisement schedule, the processor 308 proceeds to step 410 where it determines the likelihood that the SCR 122 can decode the advertisement message properly according to a predetermined expectation, which is programmed into the SCR 122. The predetermined expectation preferably comprises at least one quality threshold determined by the service provider of the communication system 100. The purpose of having one or more quality thresholds is to achieve an expected degree of message integrity for point-to-point transmission of messages in the communication system 100.

As was pointed out earlier, radio communication systems are susceptible to environment noise disturbances that may cause bit errors in selective call messages transmitted to SCRs 122. To restore message integrity at the SCRs 122, the Flex family of protocols utilize an error correction algorithm, such as a (31, 21) Bose, Chaudhuri, Hocquemghem (BCH) encoding format, for correcting these errors. The BCH algorithm can correct up to 2 bit errors per code word. As a consequence of the limited number of bit errors that can be corrected per code word, a service provider could select a quality threshold whereby SCRs 122 are programmed to disregard advertisement messages received with more bit errors than are correctable.

Quality thresholds may also account for instances when a SCR 122 is indisposed. For example, a SCR 122 may be engaged in a power-up sequence, and as a consequence, may not have yet turned on the receiver 304 to receive messages. Alternatively, a SCR 122 may be in the process of being reprogrammed. A SCR 122 might also detect that it is in a poor coverage of the communication system 100, where the bit error rate (BER) is too high to reconstruct error-free advertisement messages. Additionally, a SCR 122 powered by a portable battery source may be indisposed because of a low battery condition, or because the user of the SCR 122 may be in the process of replacing the SCR's 122 worn-out battery with a fresh one. Other possibilities include housekeeping shores such as backing up memory, and performing periodic memory checks at, e.g., midnight. These examples account for a few of the possible reasons why a SCR 122 might not be able to decode an advertisement message properly. All of these possibilities can be programmed into the memory 310 of the SCR 122 as quality thresholds that may be used to reject or accept advertisement messages at scheduled arrival times defined by the advertisement schedule.

Turning back to the flowchart of FIG. 5, once the processor 308 has determined the likelihood of successfully decoding the advertisement message scheduled to arrive at the first arrival time, the processor 308 proceeds to step 412 where it decides to either receive or disregard the advertisement message according to the quality thresholds preprogrammed into the SCR 122 by the service provider. If the SCR 122 can receive and decode the advertisement message properly, then the processor 308 proceeds to step 414 where it receives the second radio signal, decodes and stores the advertise message included therein, and informs the user of the SCR 122 that a message has arrived.

If, on the other hand, the likelihood of decoding the advertisement message properly is below the predetermined expectation set by the service provider of the communication system 100, then the processor 308 proceeds to step 416 where it disregards the second radio signal. Thereafter, the processor 308, in step 418, schedules the SCR 122 to receive the advertisement message at a second arrival time (subsequent to the first arrival time, e.g., 11:05 a.m.) defined by the advertisement schedule. Finally, the processor 308 proceeds to step 420 where it powers down the SCR 122 to conserve energy, thereby extending the battery life of the SCR 122.

As should be evident from the discussions above, the present invention is substantially advantages to the prior art. Particularly, the present invention provides a method and apparatus for communicating advertisement messages in a radio communication system in a manner that substantially eliminates the possibility of receiving at a SCR 122 an advertisement message including errors that are either undetectable or beyond correction. By doing so, the present invention considerably reduces the likelihood that a user of an SCR 122 will read a received advertised message that includes misquoted information.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a SCR (Selective Call Radio), a method comprising:
   receiving a first radio signal comprising an advertisement schedule detailing multiple times of arrival for a plurality of advertisement messages, wherein the advertisement schedule identifies a plurality of arrival times for each of the plurality of advertisement messages within a predetermined period of time, and further wherein the advertisement schedule identifies a first arrival time and a second arrival time for an advertisement message;
   storing the advertisement schedule;
   at or near the first arrival time when an advertisement message is to be received as a second radio signal according to the advertisement schedule, determining a likelihood that the SCR can decode the advertisement message properly according to a predetermined quality expectation which is preprogrammed into the SCR;
   when the likelihood of decoding the advertisement message properly is below the predetermined quality expectation, disregarding the second radio signal; and
   scheduling the SCR to receive the same advertisement message at the second arrival time defined by the stored advertisement schedule, wherein the second arrival time is subsequent to the first arrival time.

2. The method as recited in claim 1, further comprising the step of powering down the SCR after the scheduling step.

3. A SCR (Selective Call Radio), comprising:
   a receiver;
   a processor coupled to the receiver, wherein the processor is adapted to:
     cause the receiver to receive a first radio signal comprising an advertisement schedule detailing multiple times of arrival for a plurality of advertisement messages, wherein the advertisement schedule identifies a plurality of arrival times for each of the plurality of advertisement messages within a predetermined period of time, and further wherein the advertisement schedule identifies a first arrival time and a second arrival time for an advertisement message;
     at or near the first arrival time when an advertisement message is to be received as a second radio signal according to the advertisement schedule, determine a likelihood that the SCR can decode the advertisement message properly according to a predetermined quality expectation which is pre-programmed into the SCR;
     when the likelihood of decoding the advertisement message properly is below the predetermined quality expectation, cause the receiver to disregard the second radio signal; and
     schedule the SCR to receive the same advertisement message at the second arrival time defined by the advertisement schedule, wherein the second arrival time is subsequent to the first arrival time.

4. The SCR as recited in claim 3, wherein the processor is further adapted to power down the SCR after the scheduling step.

5. In a communication system comprising a radio communication system and a SCR (Selective Call Radio), a method comprising:
   at the radio communication system,
     transmitting to the SCR a first radio signal comprising an advertisement schedule detailing multiple times of arrival for a plurality of advertisement messages, wherein the advertisement schedule identifies a plurality of arrival times for each of the plurality of advertisement messages within a predetermined period of time, and further wherein the advertisement schedule identifies a first arrival time and a second arrival time for an advertisement message;
     transmitting to the SCR a second radio signal comprising the advertisement message at the first arrival time according to the advertisement schedule;
   at the SCR,
     receiving the first radio signal including the advertisement schedule;
     storing the advertisement schedule;
     at or near the first arrival time, determining a likelihood that the SCR can decode the advertisement message properly according to a predetermined quality expectation which is pre-programmed into the SCR;
     when the likelihood of decoding the advertisement message properly is below the predetermined quality expectation, disregarding the second radio signal; and
     scheduling the SCR to receive the same advertisement message at the second arrival time defined by the stored advertisement schedule, wherein the second arrival time is subsequent to the first arrival time.

6. The method as recited in claim 5, further comprising the step of powering down the SCR after the scheduling step.

7. A communication system, comprising:
   a radio communication system, including:
     a transmitter;
     a processing system coupled to the transmitter, wherein the processing system is adapted to:
       cause the transmitter to transmit to a SCR (Selective Call Radio) a first radio signal comprising an advertisement schedule detailing multiple times of arrival for a plurality of advertisement messages wherein the advertisement schedule identifies a plurality of arrival times for each of the plurality of advertisement messages within a predetermined period of time, and further wherein the advertisement schedule identifies a first arrival time and a second arrival time for an advertisement message;

cause the transmitter to transmit to the SCR a second radio signal comprising the advertisement message at the first arrival time according to the advertisement schedule;

the SCR, including:
a receiver;
a processor coupled to the receiver, wherein the processor is adapted to:
cause the receiver to receive the first radio signal including the advertisement schedule;
store the advertisement schedule;
at or near the first arrival time, determine a likelihood that the SCR can decode the advertisement message properly according to a predetermined quality expectation which is pre-programmed into the SCR;
when the likelihood of decoding the advertisement message properly is below the predetermined quality expectation, disregard the second radio signal; and
schedule the SCR to receive the same advertisement message at the second arrival time defined by the stored advertisement schedule, wherein the second arrival time is subsequent to the first arrival time.

8. The communication system as recited in claim 7, wherein the processor is further adapted to power down the SCR after the scheduling step.

9. The SCR of claim 1, wherein the predetermined quality expectation is based on a predetermined number of bit errors.

10. The SCR of claim 1, wherein the predetermined quality expectation is based on a bit error rate.

11. The SCR of claim 1, wherein the predetermined quality expectation is based on a predetermined battery condition.

12. The SCR of claim 1, wherein the predetermined quality expectation is created by the SCR being indisposed.

13. The SCR of claim 3, wherein the predetermined quality expectation is based on a predetermined number of bit errors.

14. The SCR of claim 3, wherein the predetermined quality expectation is based on a bit error rate.

15. The SCR of claim 3, wherein the predetermined quality expectation is based on a predetermined battery condition.

16. The SCR of claim 3, wherein the predetermined quality expectation is created by the SCR being indisposed.

17. The SCR of claim 5, wherein the predetermined quality expectation is based on a predetermined number of bit errors.

18. The SCR of claim 5, wherein the predetermined quality expectation is based on a bit error rate.

19. The SCR of claim 5, wherein the predetermined quality expectation is based on a predetermined battery condition.

20. The SCR of claim 5, wherein the predetermined quality expectation is created by the SCR being indisposed.

* * * * *